United States Patent
Van Brocklin et al.

(10) Patent No.: US 7,532,226 B2
(45) Date of Patent: May 12, 2009

(54) BLEACHING THE BACKGROUND OF A MEDIUM

(75) Inventors: Andrew L. Van Brocklin, Corvallis, OR (US); Makarand P. Gore, Corvallis, OR (US); Jayprakash C. Bhatt, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 153 days.

(21) Appl. No.: 11/194,221

(22) Filed: Aug. 1, 2005

(65) Prior Publication Data

US 2007/0024695 A1 Feb. 1, 2007

(51) Int. Cl.
*B41J 2/435* (2006.01)

(52) U.S. Cl. .................................................. 347/224

(58) Field of Classification Search ................. 503/221; 430/5, 332, 334, 338–339; 347/224, 225; 369/112.04; 250/201.5; 372/50.1
See application file for complete search history.

(56) References Cited

U.S. PATENT DOCUMENTS

| | | | |
|---|---|---|---|
| 4,713,312 A * | 12/1987 | Adair et al. ................. 430/138 |
| 5,153,169 A * | 10/1992 | Freedman et al. ........... 503/209 |
| 5,773,170 A * | 6/1998 | Patel et al. ...................... 430/5 |
| 6,618,420 B1 * | 9/2003 | Gen-Ei et al. ............... 372/50.1 |
| 7,091,653 B2 * | 8/2006 | Ouderkirk et al. ........... 313/113 |
| 2002/0097659 A1 * | 7/2002 | Furuhata et al. ........ 369/112.04 |
| 2004/0146812 A1 * | 7/2004 | Gore et al. ................... 430/343 |
| 2004/0147399 A1 * | 7/2004 | Gore .......................... 503/221 |
| 2004/0156276 A1 * | 8/2004 | Kuo ........................ 369/44.26 |
| 2005/0180308 A1 * | 8/2005 | Shibata et al. .............. 369/288 |
| 2006/0132585 A1 * | 6/2006 | Van Brocklin et al. ...... 347/221 |
| 2006/0147833 A1 * | 7/2006 | Kasperchik et al. ........ 430/270.1 |
| 2006/0261243 A1 * | 11/2006 | Park et al. ................ 250/201.5 |
| 2007/0015092 A1 * | 1/2007 | Gore et al. .................. 430/332 |

OTHER PUBLICATIONS

Few Chemicals, Solvent Soluable Cyanine Dyes: S 0332, http://few.de/english/farbstoffe/solvent_soluable_cyanine_dyes/s0322.html.*

* cited by examiner

*Primary Examiner*—Hai C Pham

(57) ABSTRACT

Embodiments include forming optically visible marks in a radiation-sensitive coating disposed on an optical disc using electromagnetic radiation having a first wavelength and bleaching a background of the radiation-sensitive coating using electromagnetic radiation having a second wavelength.

22 Claims, 5 Drawing Sheets

BLEACHING THE BACKGROUND OF A MEDIUM

BACKGROUND

Coatings that can produce optically visible markings on media upon exposure to electromagnetic radiation such as, for example, laser light, are of great interest for producing labels and images on a variety of substrates. For example, the labeling of media such optical storage discs, such as (compact discs) CDs, (digital versatile discs) DVDs, and the like, may be used in conjunction with such systems. Such media may include a light-sensitive material coated on, or fabricated as part of, a label region of the media. One such material may include a dye, often called an antenna or absorber dye. Exposing the coating to photo-chemicals or electromagnetic radiation produces a chemical change in the coating that shows up as visible marks on the label side that form a portion of a label. A problem with some absorber dyes is that they can produce an undesirably dark background in the label region.

DETAILED DESCRIPTION

In the following detailed description of the present embodiments, reference is made to the accompanying drawings that form a part hereof, and in which is shown by way of illustration specific embodiments that may be practiced. These embodiments are described in sufficient detail to enable those skilled in the art to practice disclosed subject matter, and it is to be understood that other embodiments may be utilized and that process, electrical or mechanical changes may be made without departing from the scope of the claimed subject matter. The following detailed description is, therefore, not to be taken in a limiting sense, and the scope of the claimed subject matter is defined only by the appended claims and equivalents thereof.

Figure 1:
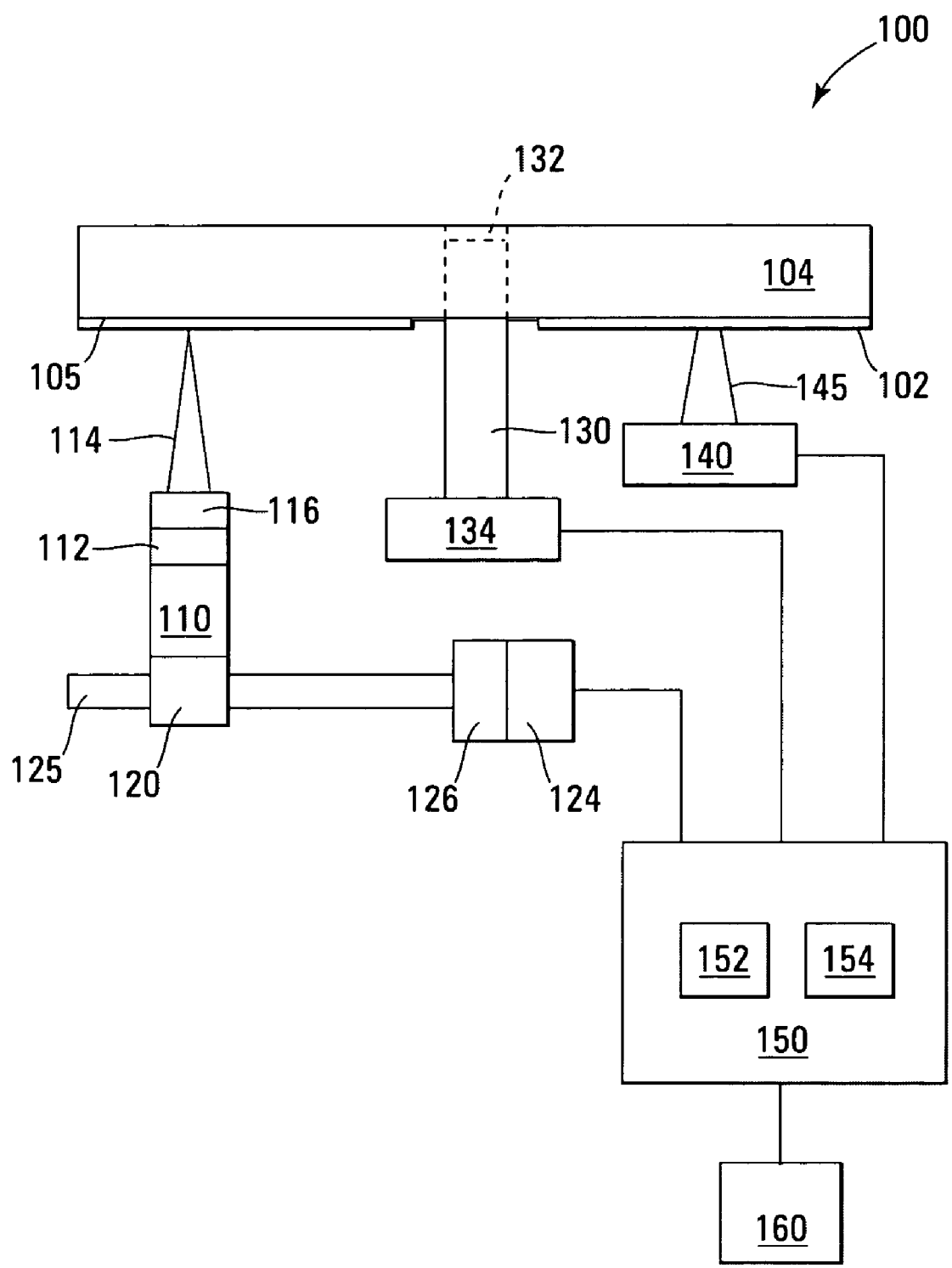
FIG. 1 is a block diagram illustrating an embodiment of an optical disc drive system, according to an embodiment of the invention.

FIG. 1 is a block diagram illustrating an optical disc drive system 100 as a portion of a disc-media marking device, according to an embodiment. Optical disc drive system 100 can produce visible marks on a label side 105 of a moveable medium, such as an optical disc 104, e.g., a compact disc (CD), a digital versatile disc (DVD), or the like by exposing an electromagnetic radiation-sensitive material, hereafter called "the coating" 102, including, e.g., an antenna dye, disposed on label side 105 to electromagnetic radiation. The disc media-marking device may be implemented as a stand-alone appliance device for labeling disc media or as part of an optical media player or drive, such as a writable compact disc (CD), a digital versatile disc (DVD) player, or the like.

Figure 2A:
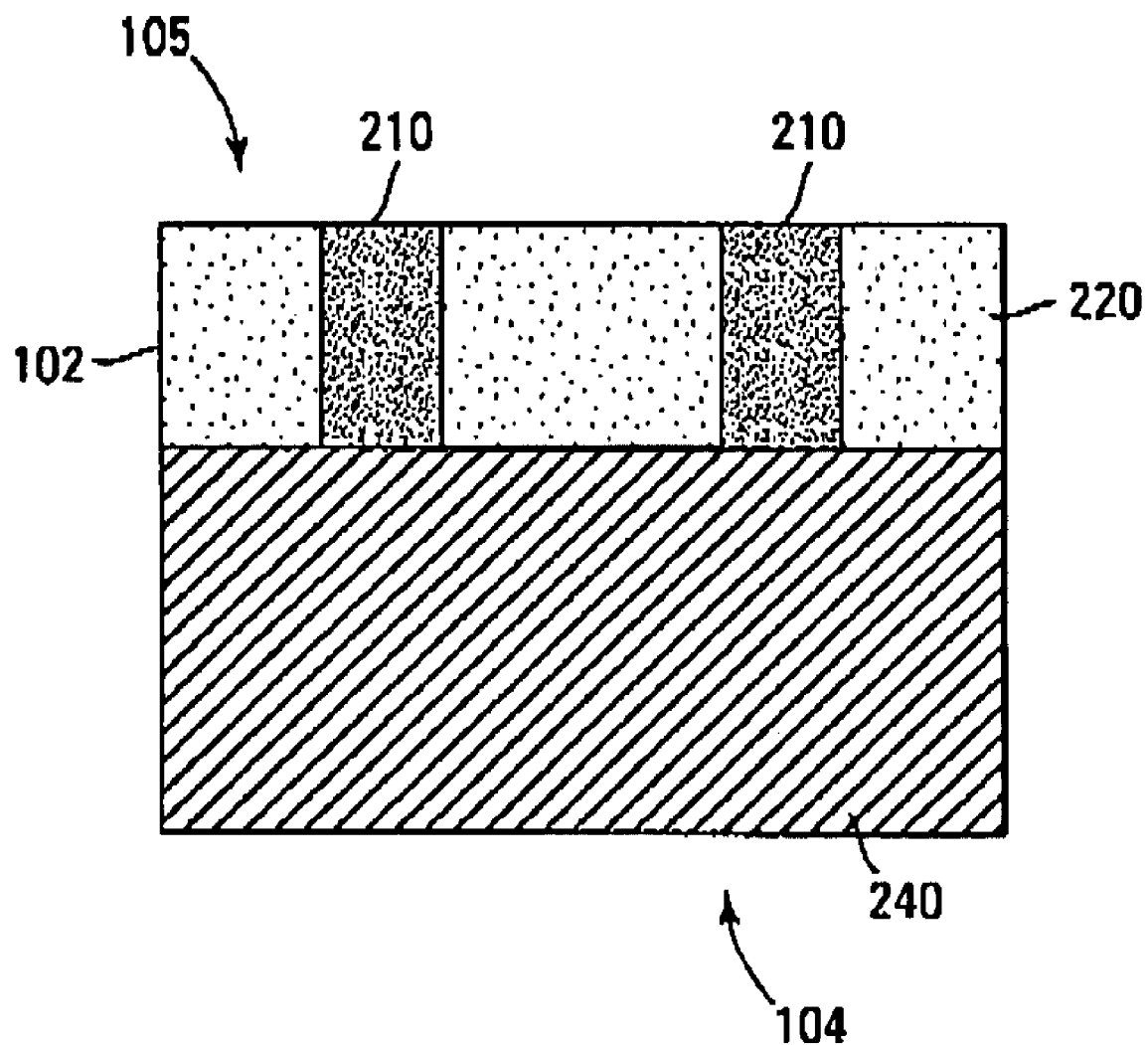
FIG. 2A illustrates optically visible marks formed on a medium, according to an embodiment of the invention.

For one embodiment, the coating 102 is absorptive of electromagnetic radiation corresponding to near infra-red electromagnetic wavelengths, e.g., wavelengths of about 760 nm to about 800 nm. For another embodiment, the coating 102 may also absorb electromagnetic radiation corresponding to visible electromagnetic wavelengths, e.g., wavelengths of about 400 nm to about 700 nm, but is less absorptive in the visible than in the near infra red. The coating 102 causes an unmarked label side 105 to be relatively dark, as shown in FIG. 2A. that results in a relatively dark background when a label is formed on the label side 105. Note that for some embodiments, optical disc 104 should be stored in a substantially ultra-violet radiation proof container, such as a foil or paper jacket, to protect optical disc 104 from ambient light, the ultra-violet component of which could act to bleach coating 102 and thus impair the function of the coating 102. An example of the absorber or antenna usable in the coating 102 is cyanine S0322 CAS#256520-09-9, available from Few Chemicals, Wolfen, Germany.

Optical disc drive system 100 includes a marking mechanism 110 for forming optically visible marks in coating 102. For one embodiment, marking mechanism 110 includes a first electromagnetic radiation source 112, such as a laser, that produces an electromagnetic radiation beam 114, e.g., a laser beam, having a first wavelength, e.g., about 780 nm for one embodiment. A focusing lens arrangement 116, e.g., an objective lens, of marking mechanism 110 focuses first electromagnetic radiation beam 114 onto the coating 102. Electromagnetic radiation from beam 114 is absorbed by the coating 102, causing the coating 102 to heat past a critical temperature, thereby producing a chemical change in the coating 102 that produces one or more optically visible marks 210 that are about as dark as (in one embodiment) or darker than (in another embodiment) unmarked regions of the coating 102, as shown in FIG. 2A. In other words, the dye used in the coating 102 on label side 105 absorbs electromagnetic radiation corresponding to the infrared or near-infrared electromagnetic wavelengths and changes at least one optically visible characteristic such as darkness or contrast so as to form a portion of a label. Note that the portion of the coating 102 in FIG. 2A not exposed to the infrared or near-infrared electromagnetic wavelengths remains relatively dark, producing an undesirably dark background 220.

Lens arrangement 116 can be moved in and out of focus, i.e., toward or away from disc 104 by marking mechanism 110. For one embodiment, the optically visible marks 210 are formed as optical disc 104 rotates. A sled 120 carries marking mechanism 110. For one embodiment, a coarse-adjust motor 124, such as a stepper motor, provides a coarse adjustment for radial movement of sled 120 on a rail 125. For another embodiment, a fine-adjust motor 126, such as a voice coil motor, provides a fine adjustment for radial movement of sled 120 on rail 125. In one embodiment, fine-adjust motor 126 provides a fine adjustment for radial position of marking mechanism 110 on sled 120. For one embodiment, a spindle 130 passes through a hole 132 at the hub of disc 104, thus passing through a center of optical disc 104. A spindle motor 134 rotates spindle 130 and thus optical disc 104. Although FIG. 1 shows label side 105 facing marking mechanism 110 so that electromagnetic radiation beam 114 impinges directly on coating 102, alternatively, for another embodiment, a data side of optical disc 104 opposite label side may face marking mechanism 110, such as would occur if optical disc 104 was flipped over. For this embodiment, electromagnetic radiation beam 114 would pass through a data layer formed on the data side, through a substrate material 240 of disc 104 (FIG. 2A), and be absorbed by coating 102, which would form the marks in coating 102.

Figure 2B:
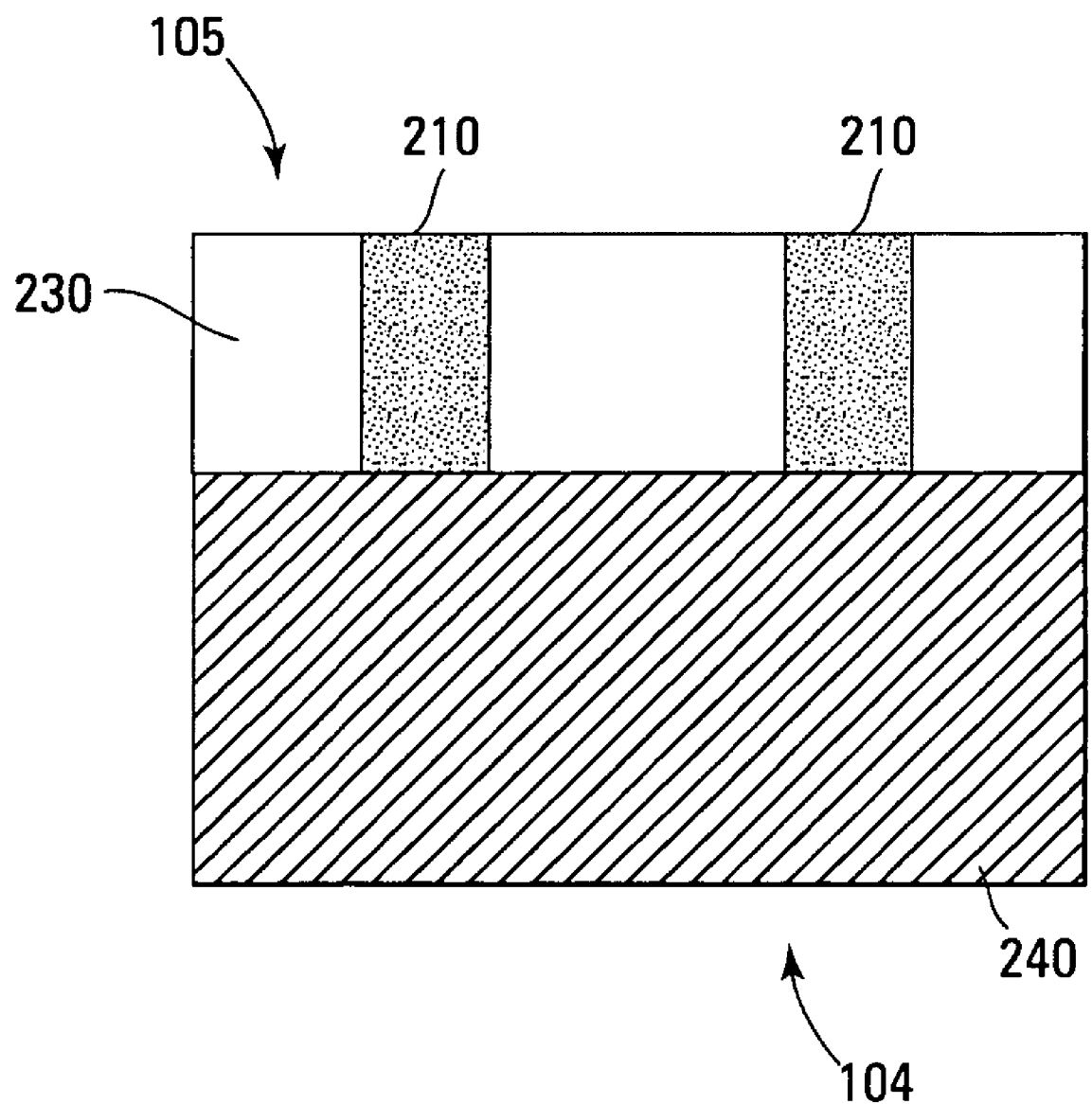
FIG. 2B illustrates the medium of FIG. 2A having a bleached background, according to an embodiment of the invention.

For one embodiment, a second electromagnetic radiation source 140 produces electromagnetic radiation 145, e.g., ultra-violet electromagnetic radiation, at a second wavelength, e.g., about 380 nm. Suitable second electromagnetic radiation sources 140 include a cold cathode fluorescent lamp that radiates broad-band ultra-violet electromagnetic radiation or an ultra-violet light emitting diode, e.g. a Nichia NCCU001 available from Nichia Corporation (Anan, Japan). Second electromagnetic radiation 145 is directed onto the coating 102 after producing the optically visible marks using electromagnetic radiation from beam 114. Exposing label side 105 to electromagnetic radiation 145 bleaches or lightens the relatively dark background exhibited by the unmarked regions, thereby producing a relatively lighter background 230 on portions of label side 105 corresponding to portions of the coating 102 not exposed to electromagnetic radiation from beam 114, as shown in FIG. 2B. Note that electromagnetic radiation 145 has substantially no effect on optically visible marks 210 formed by electromagnetic radiation beam 114.

Bleaching allows substrate material 240 having, e.g., a silver or gold color, or a coating formed on substrate material 240 (not shown), having e.g., a white or other color, to show through the bleached portion of the coating so that the background 230 appears substantially the color of the substrate material 240 or the coating. For one embodiment, bleaching is performed as optical disc 104 rotates whereas for another embodiment bleaching is performed while optical disc 104 is stationary. Note that after bleaching, it is no longer necessary to protect optical disc 104 from the ultra-violet components of the ultra-violet light, e.g., by storing optical disc 104 in a substantially ultra-violet radiation proof container, as described above.

For one embodiment, second electromagnetic radiation source 140 is configured to produce a spot of electromagnetic radiation 145 on label side 105 that spans one or more tracks of label side 105. For another embodiment, the spot is moved radially over label side 105 and is focused on tracks of optically visible marks. For one embodiment, the spot may be moved by moving second electromagnetic radiation source 140 on a rail similar to rail 125 using a motor(s) similar to coarse-adjust motor 124 and/or fine-adjust motor 126. For another embodiment, electromagnetic radiation 145 can cover one or multiple tracks or the entire coating 102 at once. Note that the optically visible marks 210 (FIG. 2A) still include coating 102, which is exposed to electromagnetic radiation 145. However, any bleaching is imperceptible.

Figure 3:
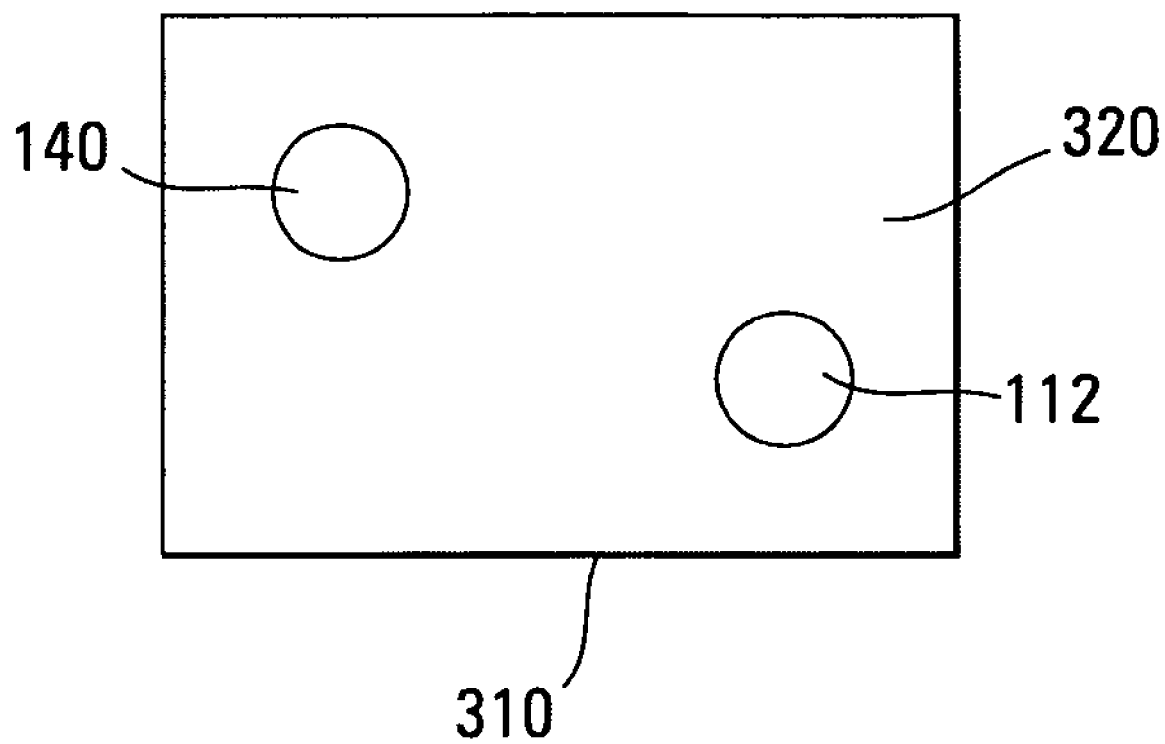
FIG. 3 illustrates an embodiment of a write head, according to an embodiment of the invention.

For some embodiments, first electromagnetic radiation source 112 and second electromagnetic radiation source 140 may be integrated into a single write head 310, as shown in FIG. 3 that shows a face 320 of write head 310 that faces the label side 105 of disc 104. This configuration enables second electromagnetic radiation source 140 to bleach tracks that have been written on one or more previous rotations of optical disc 104 using first electromagnetic radiation source 112. Note that for one embodiment, electromagnetic radiation sources 112 and 140 are misaligned (or staggered) to enable bleaching of tracks by electromagnetic radiation source 140 after the marks are formed by electromagnetic source 112. Note further that write head 310 is carried by sled 120 of FIG. 1.

For another embodiment, the data side of disc 104 may face electromagnetic radiation source 140 instead of label side 105. For this embodiment, passing electromagnetic radiation 145 through the data layer and substrate 240 and onto coating 102 bleaches coating 102.

In some embodiments, a controller 150 controls marking mechanism 110, spindle motor 134, coarse-adjust motor 124, fine-adjust motor 126, and second electromagnetic radiation source 140. For another embodiment, controller 150 is coupled to a host 160, such as a main controller of a disc-media marking device, a computer that includes optical disc drive system 100, or the like.

For one embodiment, controller 150 includes a processor 152 for processing computer/processor-readable instructions. These computer-readable instructions are stored on a computer-usable media 154 and may be in the form of software, firmware, or hardware. As a whole, these computer-readable instructions are often termed a device driver. In a hardware solution, the instructions may be hard coded as part of a processor, e.g., an application-specific integrated circuit (ASIC) chip. In a software or firmware solution, the instructions may be stored for retrieval by the processor 152. Some additional examples of computer-usable media include static or dynamic random access memory (SRAM or DRAM), read-only memory (ROM), electrically-erasable programmable ROM (EEPROM or flash memory), magnetic media and optical media, whether permanent or removable.

Figure 4:
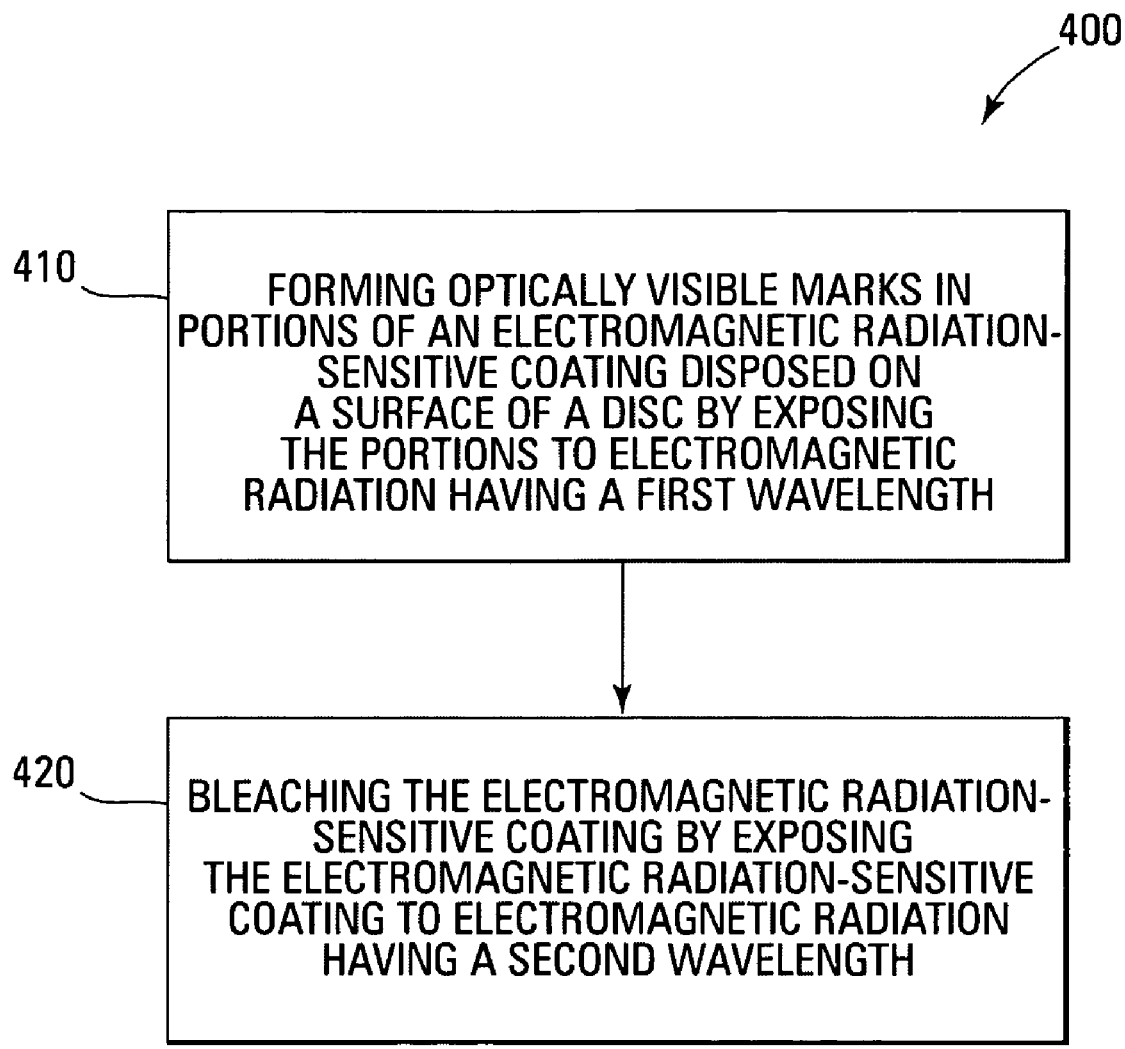
FIG. 4 is a flowchart of an embodiment of a method, according to an embodiment of the invention.

FIG. 4 is a flowchart of a method 400 of labeling a disc, such as disc 110, according to another embodiment. At block 410, portions of the coating 102 are exposed to electromagnetic radiation beam 114 having a first wavelength, e.g., about 780 nm for one embodiment. Electromagnetic radiation beam 114 causes the exposed portions to heat past a critical temperature that produces a chemical change in the coating 102 at each of the exposed portions. The chemical change produces an optically visible mark 210 at each of the exposed portions that is about as dark or darker than the coating 102, as shown in FIG. 2A. However, at this stage, the coating 102 not exposed to electromagnetic radiation beam 114 is unacceptably dark. Therefore, at block 420, the coating 102 is exposed to electromagnetic radiation 145, e.g., ultra-violet electromagnetic radiation, at a second wavelength, e.g., about 380 nm, that bleaches the portions of the coating 102 not exposed to electromagnetic radiation beam 114. This enables substrate material 240 located beneath the coating 102 (FIG. 2B) or a coating (not shown) located between substrate material 240 and the coating 102 to be optically visible at the portions not exposed to electromagnetic radiation beam 114.

For one embodiment disc 110 is essentially "write-once," and after bleaching disc 110 cannot be further marked. Therefore, coating 102 may be particularly suitable for write-once CD & DVD media, e.g., the desired data is written, the data session is finalized so that no more data can be written, the label is formed, and the disk bleached so that no more labeling can be added.

CONCLUSION

Although specific embodiments have been illustrated and described herein, the invention is not limited to such embodiments. For example, while the present invention has been described with reference to an optical disk drive, it may be embodied in other printing or label-forming systems for marking other forms of media, such as sheets or rolls of a paper or plastic substrate containing the light-sensitive material. It is manifestly intended that the scope of the claimed subject matter be limited only by the following claims and equivalents thereof.

What is claimed is:

1. A method of producing a label on a markable medium, comprising:
    forming optically visible marks in a relatively dark radiation-sensitive coating disposed on the markable medium by exposing first portions of the radiation-sensitive coating to first electromagnetic radiation having a first wavelength to form the marks while the markable medium is positioned in a marking device; and bleaching second portions of the radiation-sensitive coating not exposed to the first electromagnetic radiation using second electromagnetic radiation having a second wavelength by exposing the second portions of the radiation-sensitive coating not exposed to the first electromagnetic radiation to the second electromagnetic radiation while the markable medium is positioned in the marking device so as to produce a relatively lighter background in the second portions of the radiation-sensitive coating;

wherein the first wavelength and second wavelength are different; and wherein bleaching the second portions of the coating enables material located beneath the coating to be optically visible at the second portions.

2. The method of claim 1, wherein the second portions include all of the coating except the first portions.

3. The method of claim 1, wherein no more optically visible marks can be formed in the coating by the first electromagnetic radiation after bleaching.

4. The method of claim 1, wherein the first electromagnetic radiation is laser light.

5. The method of claim 1, wherein the first wavelength is longer than the second wavelength.

6. The method of claim 1, wherein the first wavelength is about 780 nm.

7. The method of claim 1, wherein the first electromagnetic radiation is near infrared or infrared radiation and the second electromagnetic radiation is ultraviolet radiation.

8. The method of claim 1, wherein the second wavelength is about 380 nm.

9. The method of claim 1, wherein the radiation-sensitive coating is absorptive of electromagnetic radiation wavelengths of about 760 nm to about 800 nm and of electromagnetic radiation wavelengths of about 400 nm to about 700 nm.

10. The method of claim 1, wherein the radiation-sensitive coating is more absorptive of near infra-red electromagnetic radiation than of visible electromagnetic radiation.

11. The method of claim 1, wherein the second electromagnetic radiation forms a spot on the radiation-sensitive coating.

12. The method of claim 1, wherein the markable medium is an optical disc.

13. The method of claim 1, wherein the markable medium is a three dimensional object.

14. A marking device, comprising:
a first electromagnetic radiation source that can produce first electromagnetic radiation having a first wavelength for exposing first portions of a relatively dark radiation-sensitive coating disposed on a medium to form optically visible marks in the radiation-sensitive coating; and a second electromagnetic radiation source that can produce second electromagnetic radiation having a second wavelength for exposing the radiation-sensitive coating to bleach second portions of the radiation-sensitive coating not exposed by the first electromagnetic radiation source, using the second electromagnetic radiation, so as to produce a relatively lighter background in the second portions of the radiation-sensitive coating that enables material located beneath the radiation-sensitive coating to be optically visible at the second portions.

15. The marking device of claim 14, wherein the first electromagnetic radiation source is a laser.

16. The marking device of claim 14, wherein the second electromagnetic radiation source is a cold cathode fluorescent lamp or a ultra-violet light emitting diode.

17. The marking device of claim 14, wherein the first electromagnetic radiation source and the second electromagnetic radiation source are integrated into a single write head.

18. The marking device of claim 14, wherein the first electromagnetic radiation is near infrared or infrared radiation and the second electromagnetic radiation is ultraviolet radiation.

19. A marking device, comprising:
a laser configured to dispose optically visible marks on a markable medium disposed in the marking device; and a ultra-violet electromagnetic radiation source configured to bleach a background of the markable medium so that material located beneath the bleached background is optically visible through the bleached background.

20. The marking device of claim 19, wherein the ultra-violet electromagnetic radiation source is a cold cathode fluorescent lamp or a ultra-violet light emitting diode.

21. The marking device of claim 19, wherein the laser and ultra-violet electromagnetic radiation source are staggered with respect to each other in the single write head.

22. The marking device of claim 19, wherein the laser and ultra-violet electromagnetic radiation source are integrated in a single write head.

* * * * *